United States Patent
Gaur

(10) Patent No.: US 8,351,390 B2
(45) Date of Patent: *Jan. 8, 2013

(54) SYSTEM AND METHOD OF QOS-BASED CHANNEL SELECTION FOR WLAN ACCESS POINTS OR STATIONS

(75) Inventor: Sudhanshu Gaur, Campbell, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/024,750

(22) Filed: Feb. 10, 2011

(65) Prior Publication Data

US 2011/0134865 A1    Jun. 9, 2011

Related U.S. Application Data

(63) Continuation of application No. 11/745,318, filed on May 7, 2007, now Pat. No. 7,912,002.

(51) Int. Cl.
 *H04W 4/00* (2009.01)
(52) U.S. Cl. ........ 370/329; 370/328; 370/338; 455/450; 455/464
(58) Field of Classification Search .................. 370/329, 370/328, 338; 455/450, 464
See application file for complete search history.

(56) References Cited

U.S. PATENT DOCUMENTS

| | | | |
|---|---|---|---|
| 6,333,937 B1 | 12/2001 | Ryan | |
| 6,738,599 B2 | 5/2004 | Black et al. | |
| 6,985,461 B2 | 1/2006 | Singh | |
| 7,580,469 B2* | 8/2009 | Yonesi et al. | 375/262 |
| 7,912,002 B2* | 3/2011 | Gaur | 370/329 |
| 2003/0181211 A1 | 9/2003 | Razavilar et al. | |
| 2004/0264413 A1 | 12/2004 | Kaidar et al. | |
| 2005/0003827 A1 | 1/2005 | Whelan | |
| 2005/0122999 A1 | 6/2005 | Scherzer et al. | |
| 2006/0029023 A1 | 2/2006 | Cervello et al. | |
| 2007/0140129 A1* | 6/2007 | Bauer et al. | 370/238 |
| 2008/0013480 A1 | 1/2008 | Kapoor et al. | |

* cited by examiner

*Primary Examiner* — Nghi H Ly
(74) *Attorney, Agent, or Firm* — Mattingly & Malur, PC

(57) ABSTRACT

A system comprises a candidate channel assessment module for obtaining at least one AC-specific channel suitability metric for each of two different channels, and for using the AC-specific channel suitability metrics to determine a channel suitability index of each of the two different channels; a channel selection module for using the channel suitability index to select one of the two different channels as a new channel; and a channel setting module for configuring a wireless transceiver to use the new channel.

12 Claims, 15 Drawing Sheets

DEFAULT EDCA AC PARAMETER SET FOR 802.11g

| AC | CWmin | CWmax | AIFSN | TXOP LIMIT (ms) |
|---|---|---|---|---|
| AC_BK (1) | 15 | 1023 | 7 | 0 |
| AC_BE (0) | 15 | 1023 | 3 | 0 |
| AC_VI (2) | 7 | 15 | 2 | 3.008 |
| AC_VO (3) | 3 | 7 | 2 | 1.504 |

*FIG. 1A (PRIOR ART)*

WEIGHT ASSIGNMENT FOR DIFFERENT ACs

| AC (ACI) | ACI | $CWmin_{ACI}$ | $AIFSN_{ACI}$ | WEIGHTS $\sigma_{ACI}=1/(CWmin_{ACI}+AIFSN_{ACI})$ | NORMALIZED WEIGHTS $\sigma_{ACI}=\sigma_{ACI}/\sigma_3$ |
|---|---|---|---|---|---|
| AC_BK | 1 | 15 | 7 | 0.045 | 0.227 |
| AC_BE | 0 | 15 | 3 | 0.055 | 0.258 |
| AC_VI | 2 | 7 | 2 | 0.111 | 0.556 |
| AC_VO | 3 | 3 | 2 | 0.200 | 1.000 |

*FIG. 5*

*(PER ONE EMBODIMENT OF INVENTION)*

SYSTEM AND METHOD OF QOS-BASED CHANNEL SELECTION FOR WLAN ACCESS POINTS OR STATIONS

CROSS-REFERENCE

This application is a continuation application of U.S. Ser. No. 11/745,318, filed May 7, 2007, now U.S. Pat. No. 7,912,002 the entire disclosure of which is hereby incorporated by reference.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to wireless local area networks, and more particularly provides a system and method of QOS-based channel selection for wireless local area network (WLAN) access points or wireless stations (STAs).

BACKGROUND

As users experience the convenience of wireless connectivity, they are demanding increasing support. WLANs are now offered by cafes, airports, hotels, businesses, residences, etc. Typical applications over wireless networks include video streaming, video conferencing, distance learning, etc. Because wireless bandwidth availability is restricted, quality of service (QoS) management is increasingly important in 802.11 networks.

The original 802.11 media access control (MAC) protocol was designed with two modes of communication for wireless stations (STAs). The first mode, Distributed Coordination Function (DCF), is based on Carrier Sense Multiple Access with Collision Avoidance (CSMA/CA), sometimes referred to as "listen before talk." A wireless station (STA) waits for a quiet period on the network and then begins to transmit data and detect collisions. The second mode, Point Coordination Function (PCF), supports time-sensitive traffic flows. Using PCF, wireless access points (APs) periodically send beacon frames to communicate network identification and management parameters specific to the wireless local area network (WLAN). Between beacon frames, PCF splits time into a contention period (CP) where the STAs implement a DCF protocol, and a contention-free period (CFP) where an AP coordinates access by the various STAs based on QoS requirements.

Because DCF and PCF do not differentiate between traffic types or sources, IEEE proposed enhancements to both coordination modes to facilitate QoS. These changes are intended to fulfill critical service requirements while maintaining backward-compatibility with current 802.11 standards.

Enhanced Distributed Channel Access (EDCA) introduces the concept of traffic categories (or access classes or traffic classes or ACs). Using EDCA, STAs try to send data after detecting that the wireless medium is idle for a set time period defined by the corresponding AC. A higher-priority AC will have a shorter wait time than a lower-priority AC. While no guarantees of service are provided, EDCA establishes a probabilistic priority mechanism to allocate bandwidth based on ACs.

The IEEE 802.11e EDCA standard provides QoS differentiation by grouping traffic into four ACs, i.e., voice (VO), video (VI), best effort (BE) and background (BK). Each transmission frame from the upper layers bears a priority value (0-7), which is passed down to the MAC layer. Based on the priority value, the transmission frames are mapped into the four ACs at the MAC layer. The VO AC has the highest priority; the VI AC has the second highest priority; the BE AC has the third highest priority; and the BK AC has the lowest priority. Each AC has its own transmission queue and its own set of AC-sensitive medium access parameters—the arbitration interframe space (AIFS) interval, contention window (CW, CWmin and CWmax), and transmission opportunity (TXOP). Traffic prioritization uses the medium access parameters to ensure that a higher priority AC has relatively more medium access opportunity than a lower priority AC.

Generally, in EDCA, AIFS is the time interval that a STA must sense the wireless medium to be idle before invoking a backoff mechanism or transmission. A higher priority AC uses a smaller AIFS interval. The contention window (CW, CWmin and CWmax) indicates the number of backoff time slots until the STA can attempt another transmission. The contention window is selected as a random backoff number of slots between 0 and CW. CW starts at CWmin. CW is essentially doubled every time a transmission fails until CW reaches its maximum value CWmax. Then, CW maintains this maximum value CWmax until the transmission exceeds a retry limit. A higher priority AC uses smaller CWmin and CWmax. A lower priority AC uses larger CWmin and CWmax. The TXOP indicates the maximum duration that an AC can be allowed to transmit frames after acquiring access to the medium. To save contention overhead, multiple transmission frames can be transmitted within one TXOP without additional contention, as long as the total transmission time does not exceed the TXOP duration.

To reduce the probability of two STAs colliding, because the two STAs cannot hear each other, the standard defines a virtual carrier sense mechanism. Before a STA initiates a transaction, the STA first transmits a short control frame called RTS (Request To Send), which includes the source address, the destination address and the duration of the upcoming transaction (i.e. the data frame and the respective ACK). Then, the destination STA responds (if the medium is free) with a responsive control frame called CTS (Clear to Send), which includes the same duration information. All STAs receiving either the RTS and/or the CTS set a virtual carrier sense indicator, i.e., the network allocation vector (NAV), for the given duration, and use the NAV together with the physical carrier sense when sensing the medium as idle or busy. This mechanism reduces the probability of a collision in the receiver area by a STA that is "hidden" from the transmitter STA to the short duration of the RTS transmission, because the STA hears the CTS and "reserves" the medium as busy until the end of the transaction. The duration information in the RTS also protects the transmitter area from collisions during the ACK from STAs that are out of range of the acknowledging STA. Due to the fact that the RTS and CTS are short, the mechanism reduces the overhead of collisions, since these transmission frames are recognized more quickly than if the whole data transmission frame was to be transmitted (assuming the data frame is bigger than RTS). The standard allows for short data transmission frames, i.e., those shorter than an RTS Threshold, to be transmitted without the RTS/CTS transaction.

With these medium access parameters, EDCA works in the following manner:

Before a transmitting STA can initiate any transmission, the transmitting STA must first sense the channel idle (physically and virtually) for at least an AIFS time interval. If the channel is idle after the initial AIFS interval, then the transmitting STA initiates an RTS transmission and awaits a CTS transmission from the receiving STA.

If a collision occurs during the RTS transmission or if CTS is not received, then the transmitting STA invokes a backoff procedure using a backoff counter to count down a random number of backoff time slots selected between 0 and CW (initially set to CWmin). The transmitting STA decrements the backoff counter by one as long as the channel is sensed to be idle. If the transmitting STA senses the channel to be busy at any time during the backoff procedure, the transmitting STA suspends its current backoff procedure and freezes its backoff counter until the channel is sensed to be idle for an AIFS interval again. Then, if the channel is still idle, the transmitting STA resumes decrementing its remaining backoff counter.

Once the backoff counter reaches zero, the transmitting STA initiates an RTS transmission and awaits a CTS transmission from the receiving STA. If a collision occurs during the RTS transmission or CTS is not received, then the transmitting STA invokes another backoff procedure, possibly increasing the size of CW. That is, as stated above, after each unsuccessful transmission, CW is essentially doubled until it reaches CWmax. After a successful transmission, CW returns to its default value of CWmin. During the transaction, the STA can initiate multiple frame transmissions without additional contention as long as the total transmission time does not exceed the TXOP duration.

The level of QoS control for each AC is determined by the combination of the medium access parameters and the number of competing STAs in the network. The default EDCA parameter values used by non-AP QoS stations (QSTAs) are identified in the table of FIG. 1. A TXOP_Limit value of 0 indicates that a single MAC service data unit (MSDU) or MAC protocol data unit (MPDU), in addition to a possible RTS/CTS exchange or CTS to itself, may be transmitted at any rate for each TXOP.

In a point-coordinated access mode, e.g., PCF, a single WLAN includes at least one AP in communication with one or more STAs. The combination of the single AP and its STAs is referred to as a "basic service set" or "BS S." FIG. 1B illustrates an example BSS network 100, which includes two BSSs 105a and 105b (each generally referred to as a BSS 105), each coupled to a computer network 110 such as the wide area network commonly referred to as the Internet. In the example shown, the BSS 105a includes an AP 115a and three (3) STAs 120a. The BSS 105b includes an AP 115b and two (2) STAs 120b. Wireless communication by the STAs 120a of BSS 105a goes through the AP 115a. Wireless communication by the stations 120b of BSS 105b goes through the AP 115b. Since most corporate WLANs require access to a wired LAN for services (e.g., file servers, network printers, Internet links, etc.), corporate WLANs typically operate using a point-coordinated access mode.

In a distributed access mode, e.g., DCF, a group of STAs operate in a manner analogous to a peer-to-peer network, in which there is no AP and no single STA is required to function as the AP. The combination of STAs in the ad-hoc network is commonly referred to as an "independent basic service set," "independent BSS" or "IBSS." FIG. 1C illustrates an IBSS 150 having four (4) STAs 155. As shown, each STA 155 is capable of communicating directly or indirectly with the other STAs 155 of the IBSS 150. IBSS 150 is useful when quick and easy setup of a WLAN is desired, where connection to a wired network is not needed (e.g., where services may not be offered, such as in a hotel room, convention, center, airport, etc.), and/or where access to a wired network is barred (e.g., for consultants at a client site). A BSS 105, e.g., BSS 105a and/or BSS 105b of FIG. 1B, may include an IBSS 150.

It should be appreciated that a WLAN operating using infrastructure mode, ad-hoc mode or a combination of the two can be referred to as a BSS 105.

When two or more BSSs 105 are located proximate to one another and are operating over the same channel, link quality may deteriorate, e.g., due to contention among the overlapping BSSs and/or signal interference. Accordingly, it becomes difficult to guarantee QoS over WLANs, e.g., for real-time multimedia applications. For example, in FIG. 1, if the BSS 105a were located proximate to BSS 105b, then the BSSs 105a and 105b may interfere with each other.

Systems and methods are needed to improve link quality caused by overlapping BSSs 105. Example prior art references include:

| U.S. Patent/Publ. No. | Inventor | Issue/Publ. Date |
| --- | --- | --- |
| U.S. Pat. No. 6,333,937 B1 | Ryan | Dec. 25, 2001 |
| U.S. Pat. No. 6,985,461 B2 | Singh | Jan. 10, 2006 |
| U.S. Pat. No. 6,738,599 B2 | Black, et al. | May 18, 2004 |
| US 2003/0181211 A1 | Razavilar, et al. | Sep. 25, 2003 |
| US 2004/0264413 A1 | Kaidar, et al. | Dec. 30, 2004 |
| US 2005/0003827 A1 | Whelan | Jan. 06, 2005 |
| US 2005/0122999 A1 | Scherzer, et al. | Jun. 09, 2005 |
| US 2006/0029023 A1 | Cervello, et al. | Feb. 09, 2006 |

| Pending Application SN | Inventor | Filing Date |
| --- | --- | --- |
| U.S. Pat. No. 11/588,778 | Zhao | Oct. 26, 2006 |

SUMMARY

In accordance with one embodiment, the present invention provides a system comprising a candidate channel assessment module for obtaining at least one AC-specific channel suitability metric for each of two different channels, and for using the AC-specific channel suitability metrics to determine a channel suitability index of each of the two different channels; a channel selection module for using the channel suitability index to select one of the two different channels as a new channel; and a channel setting module for configuring a wireless transceiver to use the new channel.

The system may include an access point. The access point may communicate with a wireless station to obtain the at least one AC-specific channel suitability metric therefrom. The channel assessment module may apply the following equations to generate the channel suitability index (CSI):

$$CSI = \Psi(LQ, CF)$$

where $\Psi$ indicates a function defining the relative success in transmitting a packet error free and as an example may be defined as:

$$\Psi(LQ, CF) = LQ \times CF$$

where LQ indicates link quality and as an example may be defined as:

$$LQ = \sum_{ACI=0}^{3} \sigma_{ACI} \Omega(\overline{RSSI}_{ACI})$$

where σ indicates a weight associated with a particular AC, the subscript ACI identifies AC index, RSSI indicates a mean received signal strength indicator, Ω indicates a function defining link robustness. The function Ω may be dependent on the modulation scheme being used. For example, assuming binary phase shift keying (BPSK) modulation, it may be defined as:

$$\Omega(\overline{RSSI}_{ACI}) = 1 - \frac{1}{2}\text{erfc}\left(\sqrt{\overline{RSSI}_{ACI}}\right)$$

where erfc(.) indicates a complementary Gaussian error function, CF indicates contention-faced and as an example may be defined as:

$$CF = \sum_{ACI=0}^{3} \tau_{ACI} \Gamma(N_{ACI}, CU_{ACI}, APER_{ACI})$$

where τ indicates a weight associated with a particular AC, CU indicates channel utilization, APER indicates average packet error rate, N indicates the number of active STAs, and Γ is a function defining relative contention faced when trying to gain access to the wireless medium and as an example may be computed as:

$$\Gamma = \frac{\{(100 - CU_{ACI}) + (100 - APER_{ACI})\}}{2N_{ACI}}.$$

The channel selection module may select the channel having the greatest channel suitability index. The system may include a wireless station, the candidate channel assessment module may include a BSS channel assessment module; and the channel selection module may include a BSS channel selection module. The system may further comprise a current channel assessment module for determining when to initiate the candidate channel assessment module. The current channel assessment module may initiate the candidate channel assessment module when a current channel link quality value fails a threshold test. The AC-specific metric may include an AC-specific link quality metric and an AC-specific contention-faced metric. The wireless transceiver may implement an IEEE 802.11e protocol.

In accordance with another embodiment, the present invention provides a method comprising obtaining at least one AC-specific channel suitability metric for each of two different channels; using the AC-specific channel suitability metrics to determine a channel suitability index of each of the two different channels; using the channel suitability index to select one of the two different channels as a new channel; and configuring a wireless transceiver to use the new channel.

The method may be operative in an access point. The method may further comprise communicating with a wireless station to obtain the at least one AC-specific channel suitability metric therefrom. The method may further comprise applying the following equations to generate the channel suitability index (CSI):

$$CSI = \Psi(LQ, CF)$$

where Ψ indicates a function defining the relative success in transmitting a packet error free and as an example may be defined as:

$$\Psi(LQ, CF) = LQ \times CF$$

where LQ indicates link quality and as an example may be defined as:

$$LQ = \sum_{ACI=0}^{3} \sigma_{ACI} \Omega(\overline{RSSI}_{ACI})$$

where σ indicates a weight associated with a particular AC, the subscript ACI identifies AC index, RSSI indicates a mean received signal strength indicator, Ω indicates a function defining link robustness. The function Ω is dependent on the modulation scheme being used. For example, assuming binary phase shift keying (BPSK) modulation, it may be defined as:

$$\Omega(\overline{RSSI}_{ACI}) = 1 - \frac{1}{2}\text{erfc}\left(\sqrt{\overline{RSSI}_{ACI}}\right)$$

where erfc(.) indicates a complementary Gaussian error function, CF indicates contention-faced and as an example may be defined as:

$$CF = \sum_{ACI=0}^{3} \tau_{ACI} \Gamma(N_{ACI}, CU_{ACI}, APER_{ACI})$$

where τ indicates a weight associated with a particular AC, CU indicates channel utilization, APER indicates average packet error rate, N indicates the number of active STAs, and Γ is a function defining relative contention faced when trying to gain access to the wireless medium and may be computed as:

$$\Gamma = \frac{\{(100 - CU_{ACI}) + (100 - APER_{ACI})\}}{2N_{ACI}}.$$

The method may further comprise selecting the channel having the greatest channel suitability index. The method may be operative in a wireless station. The method may further comprise determining when to initiate the candidate channel assessment module. The method may further comprise initiating the candidate channel assessment module when a current channel link quality value fails a threshold test. The AC-specific metric includes an AC-specific link quality metric and an AC-specific contention-faced metric.

In accordance with yet another embodiment, the present invention provides a system comprising means for obtaining at least one AC-specific channel suitability metric for each of two different channels; means for using the AC-specific channel suitability metrics to determine a channel suitability index of each of the two different channels; means for using the channel suitability index to select one of the two different channels as a new channel; and means for configuring a wireless transceiver to use the new channel.

BRIEF DESCRIPTION OF THE DRAWINGS

FIG. 1A is a table of a prior art EDCA access class (AC) parameter set for 802.11g.

FIG. 5 is a table illustrating example weight assignments for different access classes, in accordance with an embodiment of the present invention.

DETAILED DESCRIPTION

The following description is provided to enable any person skilled in the art to make and use the invention, and is provided in the context of a particular application and its requirements. Various modifications to the embodiments are possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

Embodiments of the present invention exploit AC-specific metrics to determine channel suitability. Embodiments of the present invention exploit AC-specific metrics in conjunction with other relevant general metrics to determine channel suitability.

Figure 2:
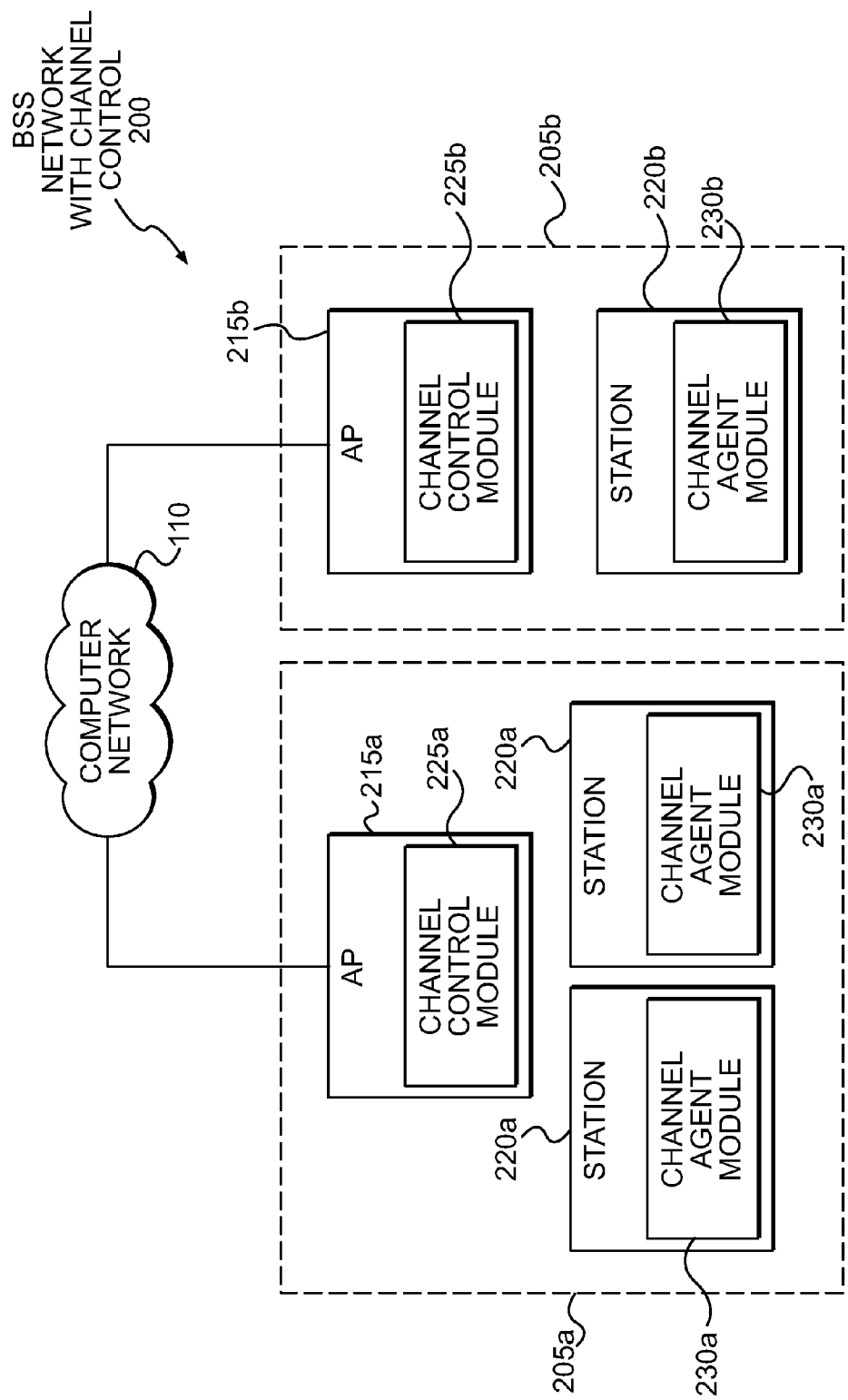
FIG. 2 is a block diagram of a BSS network using a point-coordinated access mode and channel control, in accordance with an embodiment of the present invention.

FIG. 2 is a block diagram of a BSS network 200 in a point-coordinated access context, in accordance with an embodiment of the present invention. The BSS network 200 includes a first BSS 205a and a second BSS 205b (each generally referred to as a BSS 205), each coupled to the computer network 110. The first BSS 205a includes an AP 215a and two STAs 220a. The second BSS 205b includes an AP 215b and one STA 220b. The AP 215a includes a channel control module 225a. The AP 215b includes a channel control module 225b, which may be the same as the channel control module 225a. Each STA 220a includes a channel agent module 230a. Each STA 220b includes a channel agent module 230b, which may be the same as the channel agent module 230a. Each of the AP 215a and the AP 215b may be generally referred to as an AP 215. Each of the STAs 220a and STA 220b may be generally referred to as a STA 220. Each of the channel control module 225a and the channel control module 225b may generally be referred to as a channel control module 225. Each of the channel agent module 230a and the channel agent module 230b may generally be referred to as a channel agent module 230.

In one embodiment, each channel control module 225 includes hardware, software and/or firmware to enable current channel suitability assessment, candidate channel suitability assessment, new channel selection, and new channel configuration. Additional details of the channel control module 225 will be described below with reference to FIG. 3. Each channel agent module 230 includes hardware, software and/or firmware to enable current channel suitability assessment, candidate channel suitability assessment, new channel configuration, and BSS channel assessment/selection. Each channel agent module 230 will be described below with reference to FIG. 4.

Generally, the channel control module 225 and the channel agent modules 230 of the STAs 220 of a BSS 205 cooperate to enable current channel suitability assessment, candidate channel suitability assessment, new channel selection, and new channel configuration.

When establishing a new BSS 205, the channel control module 225 and channel agent modules 230 may initially configure the new BSS 205 to communicate over a default channel, over a channel randomly selected from available channels, etc. The channel control module 225 and channel agent modules 230 may assess current channel suitability upon setup, on a periodic basis, at predetermined times, and/or the like. In one embodiment, the channel control module 225 initiates current channel suitability assessment. In another embodiment, each channel agent module 230 independently assesses current channel suitability (e.g., substantially continuously, on a periodic basis, etc.), and informs the channel control module 225 when current channel suitability is below a threshold. Then, the channel control module 225 may initiate candidate channel suitability assessment and new channel selection.

Figure 3:
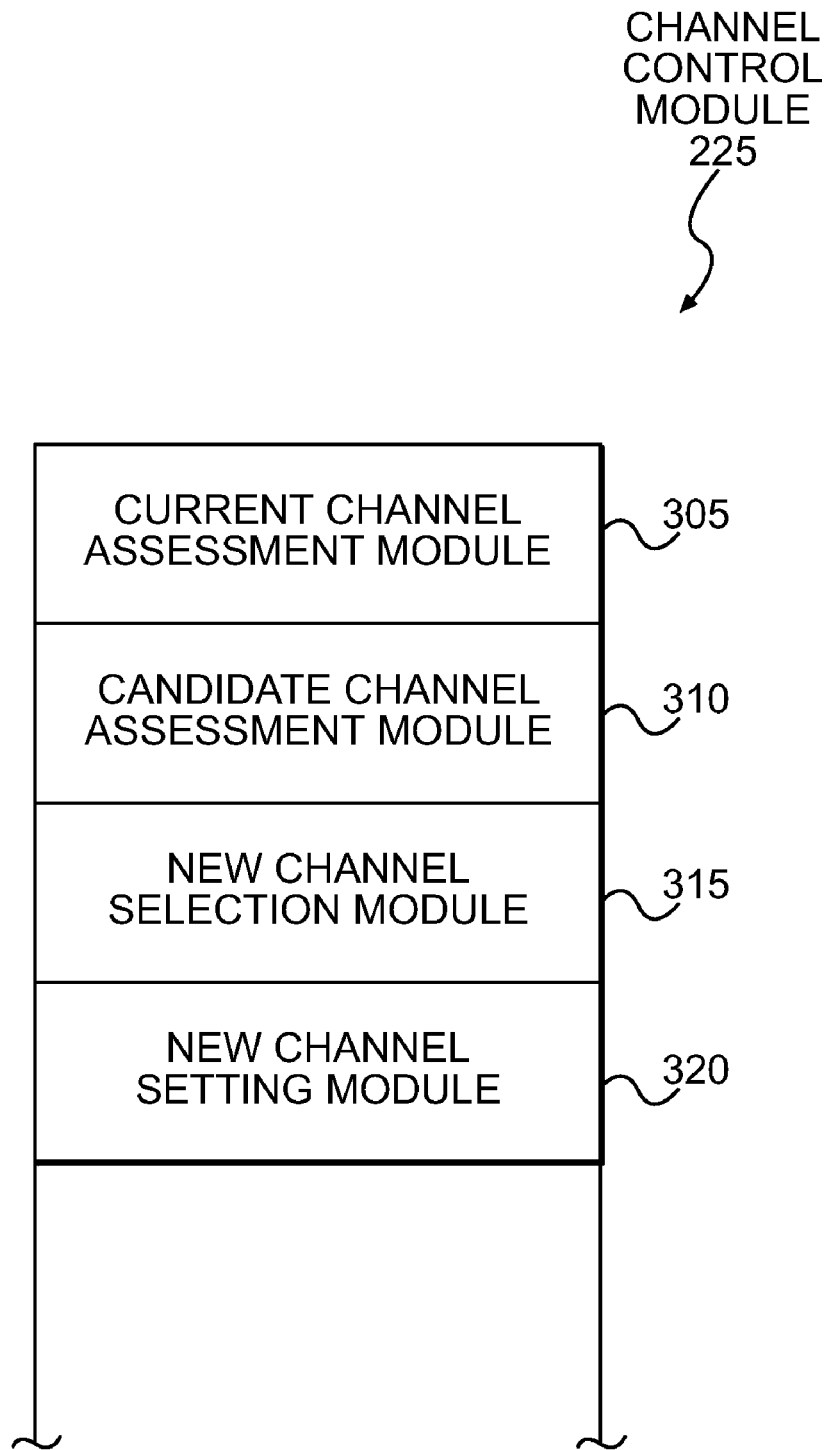
FIG. 3 is a block diagram of a channel control module of FIG. 2, in accordance with an embodiment of the present invention.

FIG. 3 is a block diagram of the channel control module 225, in accordance with an embodiment of the present invention. The channel control module 225 includes a current channel assessment module 305, a candidate channel assessment module 310, a new channel selection module 315, and a new channel setting module 320.

The current channel assessment module 305 includes hardware, software and/or firmware to initiate/schedule current channel suitability assessment, e.g., upon setup, on a periodic basis, on an event-initiated basis, upon request by a STA 120, upon user request, at predetermined times, and/or the like. In one embodiment, the current channel assessment module 305 communicates with the channel agent module 230 of each STA 220, e.g., to provide parameters and initiate current channel suitability assessment. Examples of channel suitability metrics may include mean received signal strength indicator (RSSI), average packet error rate (APER), noise, signal-to-noise ratio (SNR), and/or the like. In some embodiments, channel suitability assessment may be on an AC-specific basis (not necessarily for all ACs).

In one embodiment, the current channel assessment module 305 includes hardware, software and/or firmware to evaluate channel suitability metrics of the current channel as noted by the AP 215. The current channel assessment module 305 determines channel suitability by measuring RSSI, noise, SNR, and/or the like, possibly on an AC-specific basis.

In one embodiment, the current channel assessment module 305 computes MAC layer link quality by inspecting the retry field in the frame header and counting the number of retries in a given time period T as described in co-pending U.S. patent application Ser. No. 11/588,788 to Zhao, which is hereby incorporated by reference.

In one embodiment, the current channel assessment module 305 may evaluate the retry count on an AC-specific basis.

In one embodiment, the current channel assessment module 305 receives the channel suitability metrics from each STA 220. In one embodiment, the current channel assessment module 305 computes averages of the channel suitability metrics as received from the STAs 315 and as measured by the current channel assessment module 305 itself. The current channel assessment module 305 may compare the channel suitability metrics against a predefined threshold to determine whether candidate channel suitability assessment may be needed. In one embodiment, the current channel assessment module 305 may conduct its threshold analysis on an AC-specific basis. The current channel assessment module 305 may weight channel suitability metrics of higher priority ACs (e.g, VO and VI) greater than lower priority ACs (e.g., BE and BK) to determine whether a current channel may no longer be suitable.

The candidate channel assessment module 310 includes hardware, software and/or firmware to evaluate candidate channel suitability of at least a portion of all possible channels (possibly including the current channel). In one embodiment, the candidate channel assessment module 310 of the AP 215 measures channel suitability metrics and communicates with the channel agent module 230 of each STA 220 to request and obtain the channel suitability metrics as measured by each STA 220. One or more of the channel suitability metrics may be on an AC-specific basis. The candidate channel assessment module 310 uses the channel suitability metrics to generate a channel suitability index (CSI).

In one embodiment, the candidate channel assessment module 310 evaluates only a predetermined set of channels, possibly includes overlapping and/or non-overlapping channels. In 802.11b and 802.11g, there are three (3) standard non-overlapping channels, namely, channel 1 (2.412 GHz), channel 6 (2.437 GHz) and channel 11 (2.462 GHz) in the 2.4 GHz bandwidth in North America. Overlapping channels may include channels between these channels such as channels 2, 3, 4, 5, 7, 8, 9 and 10. At this time, the FCC does not allow private use of channels above channel 11. The candidate channel assessment module 310 may prioritize standard non-overlapping channels over non-standard channels and over overlapping channels.

In one embodiment, the candidate channel assessment module 310 selects a first channel to evaluate, classifies the traffic on the channel based on AC, obtains one or more channel suitability metrics on an AC-specific basis, possibly obtains general channel suitability metrics, and determines a channel suitability index (CSI), which can be used to grade and compare each of the channels.

In one embodiment, the candidate channel assessment module 310 classifies traffic by either (a) observing the average time slot used to begin data transmission as it is dependent on the arbitration inter-frame spacing number (AIFSN) and the minimum contention window size (CWmin) values which are AC specific; or (b) observing the duration of channel busy state as limited by the transmission opportunity (TXOP) parameter which is also AC specific. By monitoring these values, the candidate channel assessment module 310 can determine the type of traffic being used by the STAs 220.

Generally, in one embodiment, the candidate channel assessment module 310 obtains one or more AC-specific channel suitability metrics of the channels by monitoring available channels and collecting channel utilization percentage (CU), the number of active STAs (N), the average packet error rate percentage (APER), and the mean received signal strength indicator ($\overline{RSSI}$) on an AC-specific basis. The APER and RSSI may be fed to the candidate channel assessment module 310 by the STAs 220 within the BSS 205.

In one embodiment, the candidate channel assessment module 310 determines link quality (LQ) metrics per AC, weights the higher priority AC-specific LQ metrics as more important than the lower priority AC-specific LQ metrics, and computes a LQ parameter based on the weighted AC-specific LQ metrics. Then, the candidate channel assessment module 310 determines a contention faced (CF) parameter based on the contention that will be faced by a STA 220 joining a BSS 205 or by a BSS 205 entering or moving to a channel. Further, the candidate channel assessment module 310 takes into account the impact of the number of STAs 220 in a particular BSS 205, since a BSS 205 with two STAs 220 using 50% of channel utilization for VI traffic risks greater contention and a BSS 205 having only one STA 220 using 50% of channel utilization for VI traffic. Based on the LQ parameter and the CF parameter, the candidate channel assessment module 310 computes a channel suitability index (CSI) that enables channel suitability comparison of the different channels.

Figure 1B:
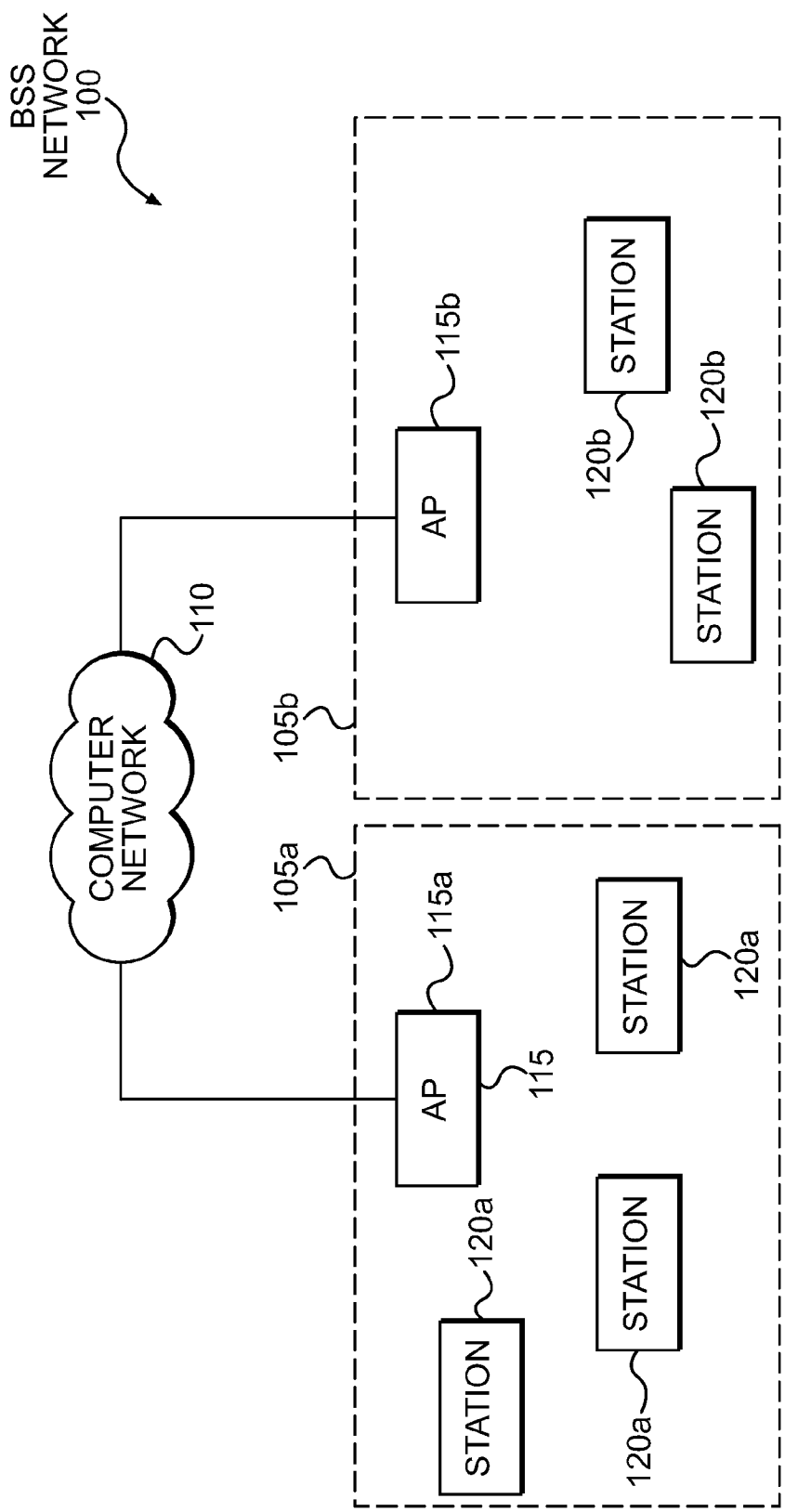
FIG. 1B is block diagram of a basic service set (BSS) network, in accordance with the prior art.
Figure 1C:
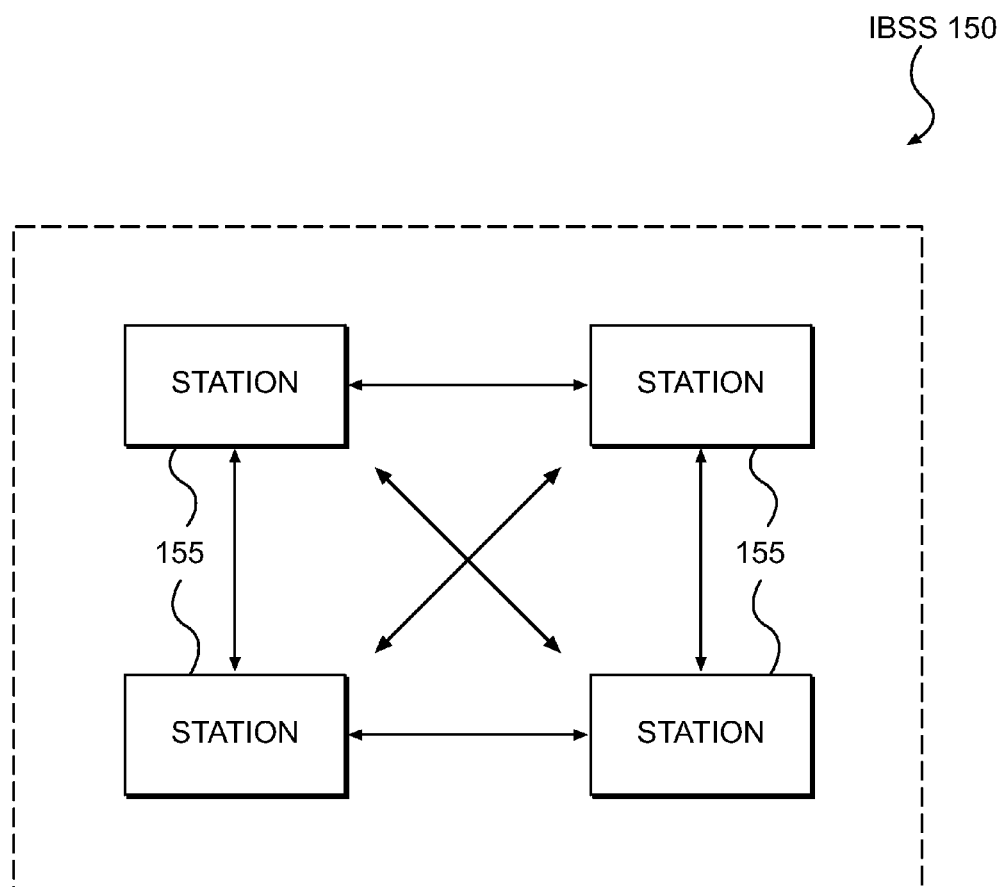
FIG. 1C is a block diagram of an independent basic service set (IBSS), in accordance with the prior art.

In one embodiment, to compute the channel suitability index (CSI), the candidate channel assessment module 420 computes the link quality (LQ) parameter as:

$$LQ = \sum_{ACI=0}^{3} \sigma_{ACI} \Omega(\overline{RSSI}_{ACI}) \qquad (1)$$

where σ indicates the weight associated with a particular AC and the subscript ACI denotes the AC index. For example, $\sigma_0$ indicates the weight for ACI=0 (which as shown in FIGS. 1 and 5 corresponds to the AC_BE). The weights $\sigma_{ACI}$ are dependent on the actual network topography. As an example, the weights can be assigned as shown in FIG. 5. The function Ω quantifies link robustness and is dependent on the modulation used. As an example, assuming BPSK modulation, Ω may be defined as:

$$\Omega(\overline{RSSI}_{ACI}) = 1 - \frac{1}{2}\text{erfc}\left(\sqrt{\overline{RSSI}_{ACI}}\right) \qquad (2)$$

where erfc(.) denotes the complementary Gaussian error function.

The candidate channel assessment module 420 computes the contention faced (CF) parameter as:

$$CF = \sum_{ACI=0}^{3} \tau_{ACI} \Gamma(N_{ACI}, CU_{ACI}, APER_{ACI}) \quad (3)$$

where τ indicates the weight associated with a particular AC and the subscript ACI denotes the AC index. The weights $\tau_{ACI}$ can be computed in the same fashion as shown in FIG. 5. The function Γ indicates the relative contention faced, while trying to gain access to the channel. Therefore, function Γ is dependent on the actual network topography. While it can be defined in a variety of different ways, one possible definition can be computed as:

$$\Gamma = \frac{\{(100 - CU_{ACI}) + (100 - APER_{ACI})\}}{2N_{ACI}} \quad (4)$$

Thus, the candidate channel assessment module 420 computes CSI as:

$$CSI = \Psi(LQ, CF) \quad (5)$$

The function Ψ indicates the relative success in transmitting a packet error free and can be defined in a variety of different ways. In one embodiment, the function Ψ can be defined as:

$$\Psi(LQ, CF) = LQ \times CF \quad (6)$$

The new channel selection module 315 includes hardware, software and/or firmware to select a new channel from the set of candidate channels by using predefined decision criteria. In one embodiment, the new channel selection module 315 selects the new channel as the candidate channel having the greatest channel suitability index (CSI). In another embodiment, the new channel selection module 315 randomly selects one of the channel candidates having a CSI value greater than a predetermined threshold. In another embodiment, the new channel may be selected from prioritized groups, in a manner similar to that described in U.S. patent application Ser. No. 11/588,788 to Zhao.

The new channel setting module 320 includes hardware, software and/or firmware to set the channel of the BSS 205 to the new channel and to inform the STAs 220 to set their channel to the new channel.

Figure 4:
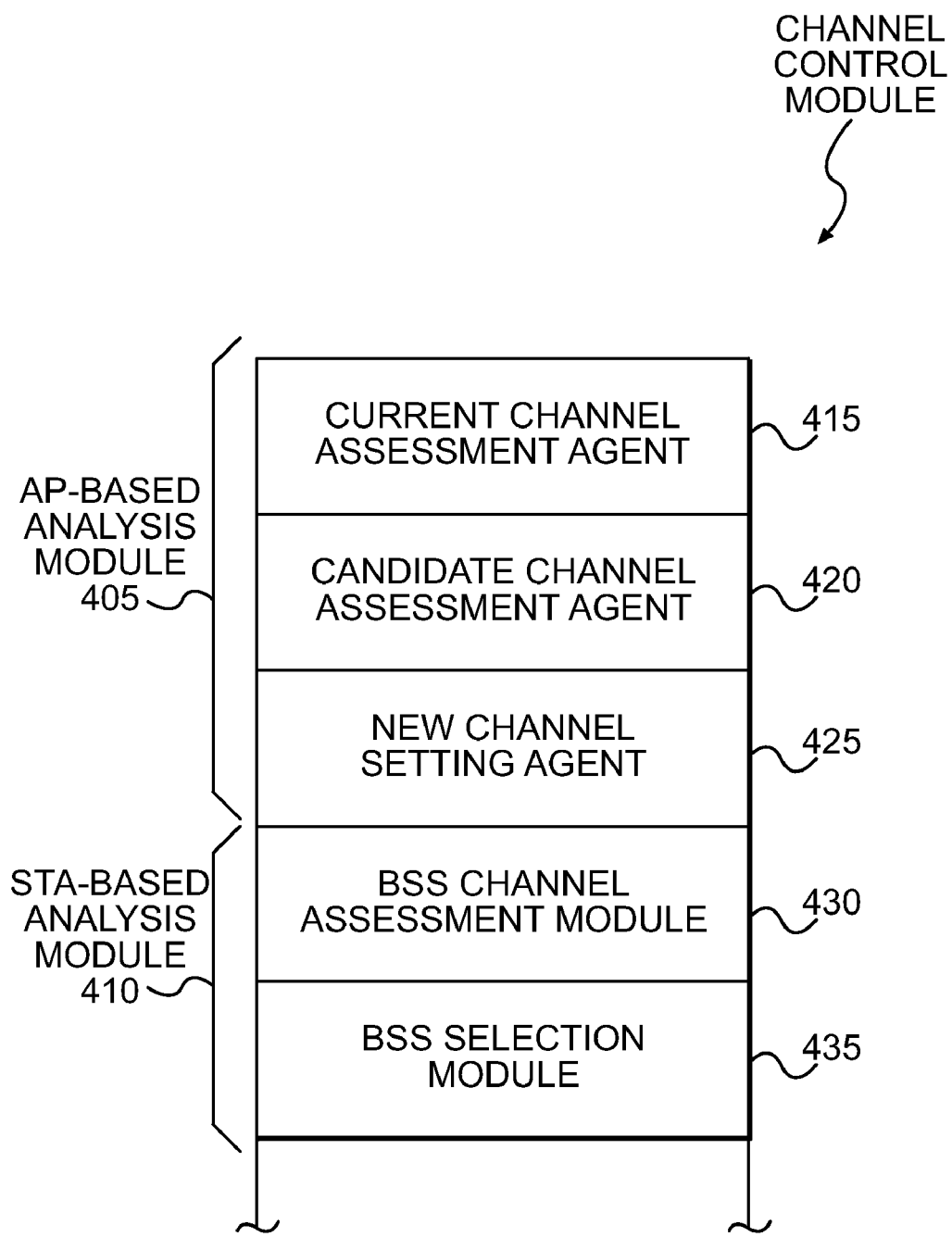
FIG. 4 is a block diagram of a channel agent module of FIG. 2, in accordance with an embodiment of the present invention.

FIG. 4 is a block diagram of a channel agent module 230, in accordance with an embodiment of the present invention. The channel agent module 230 includes an AP-based analysis module 405 and a STA-based analysis module 410.

The AP-based analysis module 405 includes hardware, software and/or firmware that operates with the channel control module 225 to facilitate channel suitability assessment and selection. The AP-based analysis module 405 includes a current channel assessment agent 415, a candidate channel assessment agent 420, and a new channel setting agent 425.

The current channel assessment agent 415 operates in a similar manner to the current channel assessment module 305 of the channel control module 225. The current channel assessment agent 415 includes hardware, software and/or firmware to communicate with the current channel assessment module 305 of the channel control module 225, e.g., to obtain the time period T over which the current channel assessment module 505 measures current channel suitability, possibly on an AC-specific basis. In one embodiment, the current channel assessment agent 415 may be configured to initiate current channel suitability assessment on a periodic or substantially continuous basis. Upon detection of poor channel suitability (e.g., average link quality lower than a threshold or AC-specific link quality lower than an AC-specific threshold), the current channel assessment agent 415 may inform the current channel assessment module 305 of the AP 115 of the poor channel suitability.

Like the current channel assessment module 305, the current channel assessment agent 415 of each STA 220 also includes hardware, software and/or firmware to measure AC-specific channel suitability metrics of the current channel (as noted by the associated STA 220). In one embodiment, the current channel assessment agent 415 measures channel suitability by measuring RSSI, noise, SNR, and/or the like on a per AC basis. In one embodiment, the current channel assessment agent 415 inspects the retry field in the frame header and counts the number of retries to and from the corresponding STA 220, possibly on a per AC basis. The current channel assessment agent 415 of each STA 220 reports the channel suitability metrics to the channel control module 225 of the AP 215, which uses the channel suitability metrics to determine whether to seek a more suitable channel.

The candidate channel assessment agent 420 is similar to the candidate channel assessment module 310 of the channel control module 225. The candidate channel assessment agent 420 includes hardware, software and/or firmware to evaluate Ac-specific candidate channel metrics of at least a portion of the available channels. In one embodiment, the candidate channel assessment module 510 measures channel metrics, e.g., RSSI, noise/traffic on a channel, SNR and/or the like, of each other channel on a per AC basis. The set of other channels to evaluate may be predefined or received dynamically from the candidate channel measure module 410. The candidate channel assessment module 510 sends the signal values measured to the candidate channel assessment module 310, which uses the signal values to determine channel candidates or the most suitable channel.

The new channel setting agent 425 is similar to the new channel setting module 320. The new channel setting agent 420 of each STA 220 includes hardware, software and/or firmware to receive identification of the new channel from the new channel setting module 320, and to set the current channel to the new channel.

The STA-based analysis module 410 includes hardware, software, and/or firmware to facilitate selection of a BSS 205 from a set of available BSSs 205. In one embodiment, the STA-based analysis module 410 selects the BSS 205 with current traffic most suitable to guarantee a high level of QoS for new multimedia traffic. The STA-based analysis module 410 includes a BSS channel assessment module 430 and a BSS selection module 435.

The BSS channel assessment module 420 includes hardware, software and/or firmware to enable the STA 220 to evaluate channel suitability metrics of each BSS 205 to determine the most suitable BSS 205. The BSS channel assessment module 420 may operate to conduct an algorithm similar to the algorithm performed by the candidate channel assessment module 305. The BSS channel assessment module 420 may gather the same or similar AC-specific channel suitability metrics and may apply those metrics to the same or similar equations to generate a CSI for each BSS 205. In one embodiment, the BSS channel assessment module 420 may query the user to determine purpose, e.g., VoIP, streaming video, general surfing, etc. or may just assume VI traffic. Thus, the BSS channel assessment module 420 may determine which BSS 205 offers the most suitable channel. Generally, the BSS channel assessment module 420 may choose the BSS 205 having less higher-priority traffic, knowing that its traffic will take precedence.

The BSS selection module 435 includes hardware, software and/or firmware that selects the BSS 205 by using predefined decision criteria. In one embodiment, the BSS selection module 425 selects the BSS 205 having the greatest channel suitability index (CSI). In another embodiment, the BSS selection module 435 randomly selects one of the BSS 205 having a CSI value greater than a predetermined threshold. In another embodiment, the BSS 205 may be selected from prioritized groups, in a manner similar to that described in U.S. patent application Ser. No. 11/588,788 to Zhao.

Figure 6:
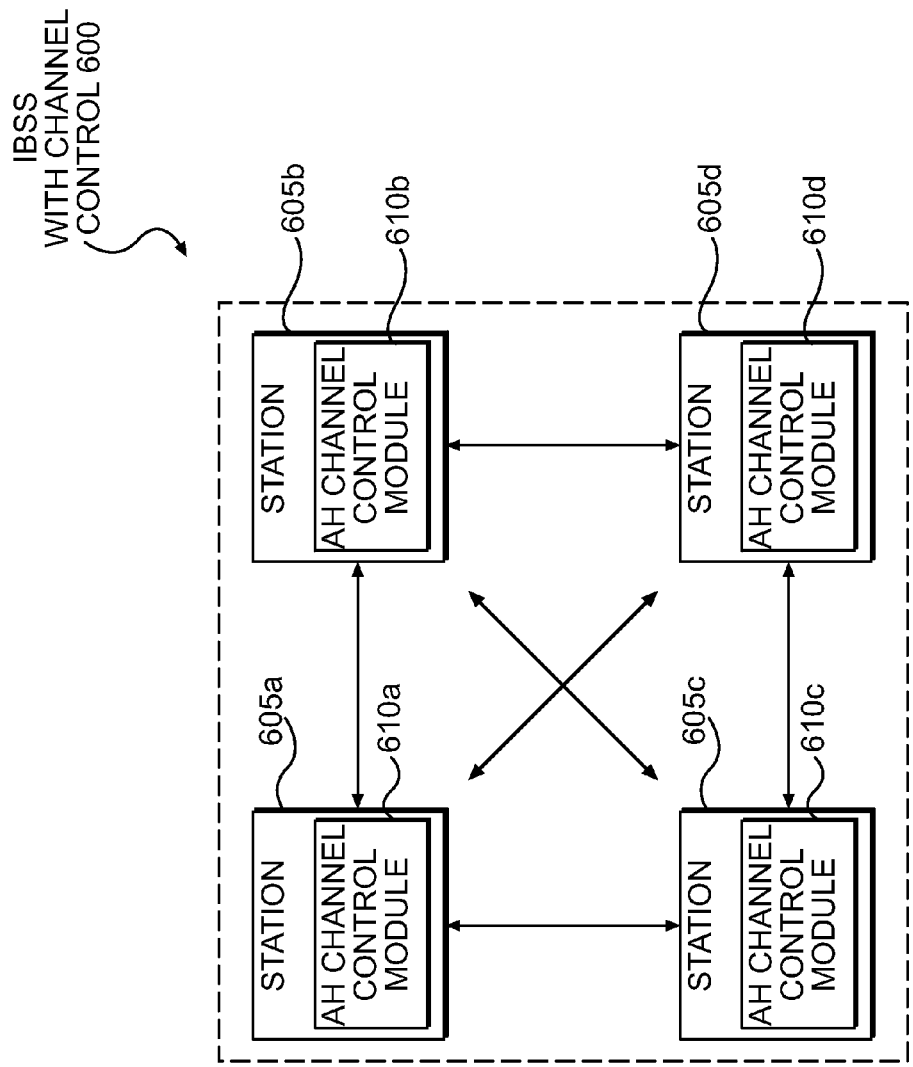
FIG. 6 is a block diagram of an IBSS with channel control, in accordance with an embodiment of the present invention.

FIG. 6 is a block diagram of an IBSS 600 with channel control, in accordance with an embodiment of the present invention. The IBSS 600 includes four (4) ad-hoc STAs 605a-605d, each having an ad-hoc channel control module 610a-610d, respectively. Each STA 605a-605d may be generally referred to as STA 605. Each ad-hoc channel control module 610a-610d may be generally referred to as ad-hoc channel control module 610. Channel control in the IBSS 600 operates in a similar manner to channel control in the BSS network 200, except that a controller (similar to the AP 215) needs to be identified. Details of the ad-hoc channel control module 610 is described in greater detail with reference to FIG. 7.

Figure 7:
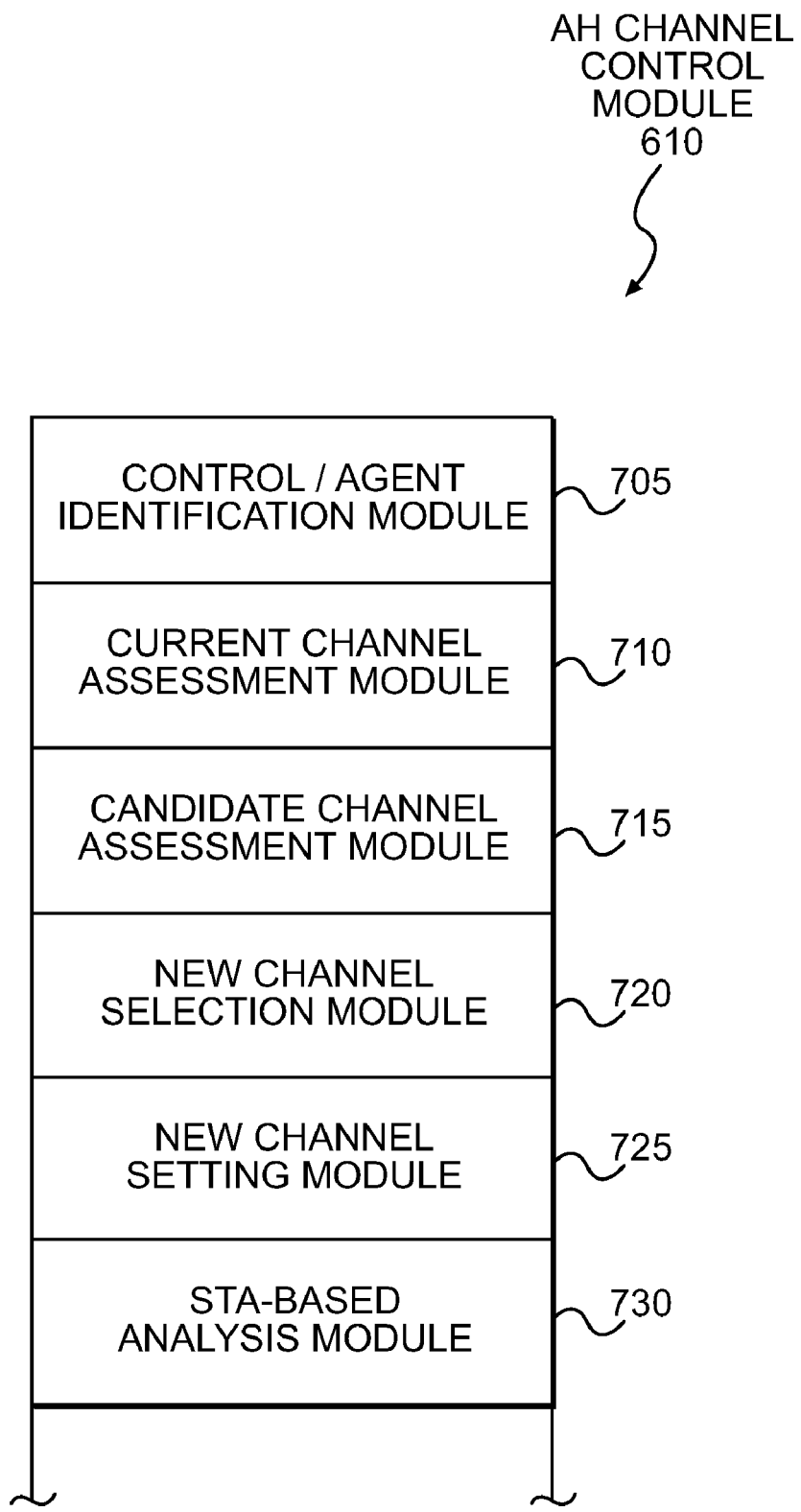
FIG. 7 is a block diagram of an ad-hoc (AH) channel control module, in accordance with an embodiment of the present invention.

FIG. 7 is a block diagram of an ad-hoc channel control module 610, in accordance with an embodiment of the present invention. The ad-hoc channel control module 610 includes a control/agent identification module 705, a current channel assessment module 710, a candidate channel assessment module 715, a new channel selection module 720, a new channel setting module 725, and a STA-based analysis module 730.

The control/agent identification module 705 includes hardware, software and/or firmware to enable the STAs 605 to determine which STA 605 shall act as the controller (e.g., similar to the AP 215 of the BSS network 200). In this embodiment, because each STA 605 includes an identical ad-hoc control module 610, each STA 605 is capable of acting as the controller. The controller may be selected arbitrarily, randomly, manually, etc. The controller may be selected as the STA 220 with the fastest CPU, the largest bandwidth, the least interference, etc. The controller may be selected based on serial numbers of the ad-hoc controller module 610. A STA 220 that first determines the current channel fails a threshold test may become the controller. Other possibilities also exist.

The current channel assessment module 710 includes hardware, software and/or firmware to operate like the current channel assessment module 305 if the STA 605 is designated as the controller and like the current channel assessment agent 415 if the STA 605 is not designated as the controller.

The candidate channel assessment module 715 includes hardware, software and/or firmware to operate like the candidate channel assessment module 310 if the STA 605 is designated as the controller and like the candidate channel assessment agent 420 if the STA 605 is not designated as the controller.

The new channel selection module 720 includes hardware, software and/or firmware to operate like the new channel selection module 315 if the STA 605 is designated as the controller and to be dormant if the STA 605 is not designated as the controller.

The new channel setting module 725 includes hardware, software and/or firmware to operate like the new channel setting module 320 if the STA 605 is designated as the controller as like the new channel setting agent 425 if the STA 605 is not designated as the controller.

The STA-based analysis module 730 includes hardware, software and/or firmware that operates like the STA-based analysis module 410, so that a STA 605 can evaluate available BSSs 205 and select the most suitable BSS 205 to associate with.

Figure 8:
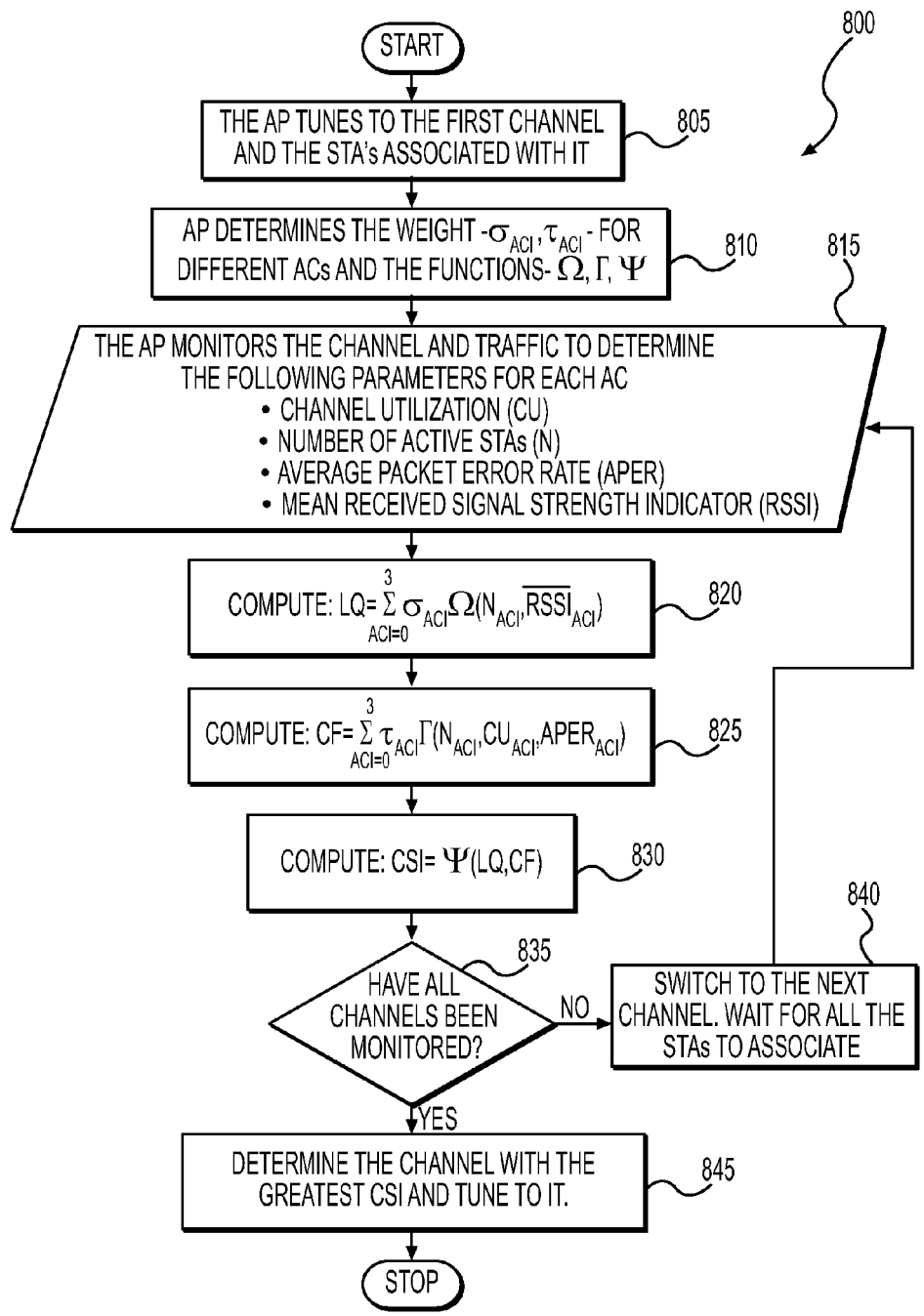
FIG. 8 is a flowchart of a method of controlling channel selection, in accordance with an embodiment of the present invention.

FIG. 8 is a flowchart of a method 800 of controlling channel selection, in accordance with an embodiment of the present invention. Method 800 begins with the AP 215 in step 805 tuning to a first channel. In response, the STAs 220 associated with the AP 215 associate with the AP 215 by tuning to the same channel. The AP 215 in step 810 determines the weights $\sigma_{ACI}$ and $\tau_{ACI}$ for the different access classes and determines the functions $\Omega$, $\Gamma$ and $\Psi$. The AP 215 in step 815 monitors the channel and traffic to determine the channel suitability metrics CU, N, APER and RSSI, possibly on a per AC basis. The AP 215 in step 820 computes a link quality (LQ) parameter according to the following equation:

$$LQ = \sum_{ACI=0}^{3} \sigma_{ACI} \Omega(N_{ACI}, \overline{RSSI}_{ACI})$$

The AP 215 in step 825 computes the contention faced (CF) parameter according to the following equation:

$$CF = \sum_{ACI=0}^{3} \tau_{ACI} \Gamma(N_{ACI}, CU_{ACI}, APER_{ACI})$$

The AP 215 in step 830 computes the channel suitability index (CSI) according to the following equation:

CSI=$\Psi$(LQ,CF)

The AP 215 in step 835 determines if all channels to be assessed have been monitored. If not, then the AP 215 in step 840 switches to the next channel, and waits for all the STAs 220 to associate to it. Method 800 then returns to step 815 to compute the channel suitability metrics for the new channel. If the AP in step 835 determines that all channels have been monitored, then the AP 215 in step 845 determines the channel with the greatest CSI value and tunes to it. The STAs 220 associate with it. Method 800 then ends.

Figure 9:
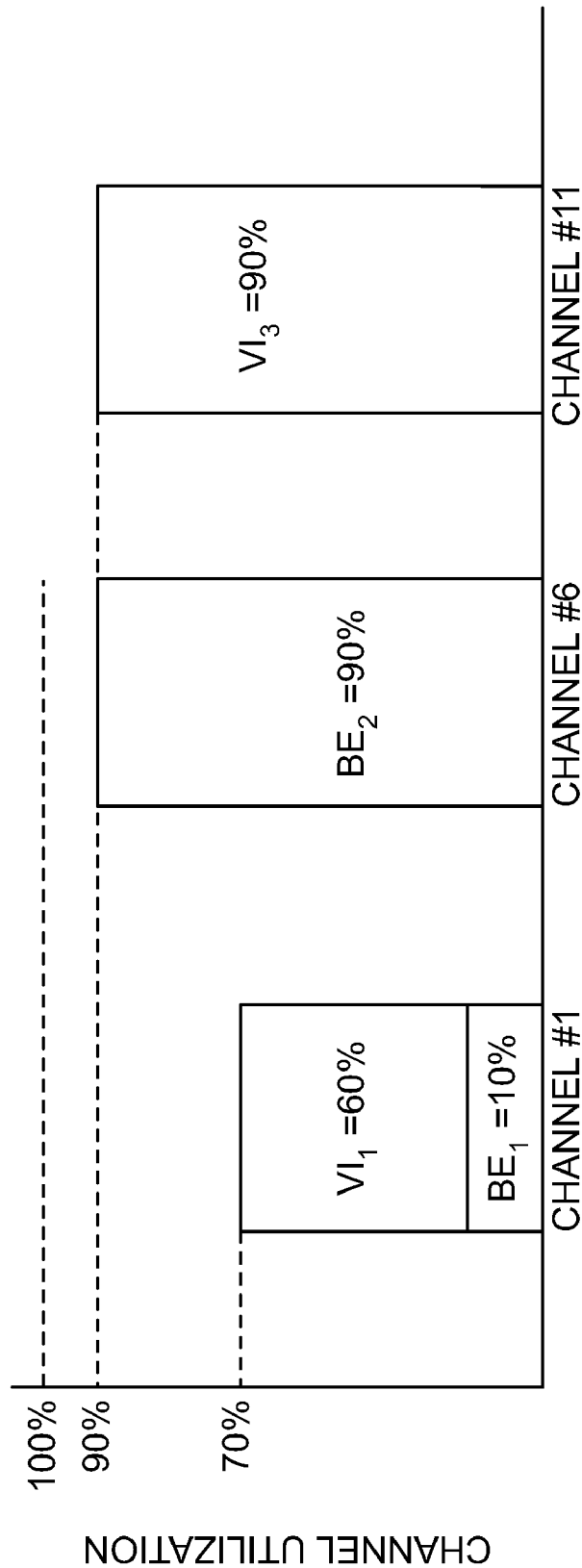
FIG. 9 is a graph illustrating an example scenario in which channel assessment and control would be helpful, in accordance with an embodiment of the present invention.

FIG. 9 is a graph illustrating an example scenario that would benefit from channel control, in accordance with an embodiment of the present invention. As shown, of 100% channel utilization, channel #1 includes 10% BE traffic and 60% VI traffic for a first BSS 205. Of the 100% channel utilization, channel #6 includes 90% BE traffic for a second BSS 205. Of the 100% channel utilization, channel #11 includes 90% VI traffic. If a new STA 220 wishes to join one of the BSS 205, it can choose from the three BSS options.

Figure 10:
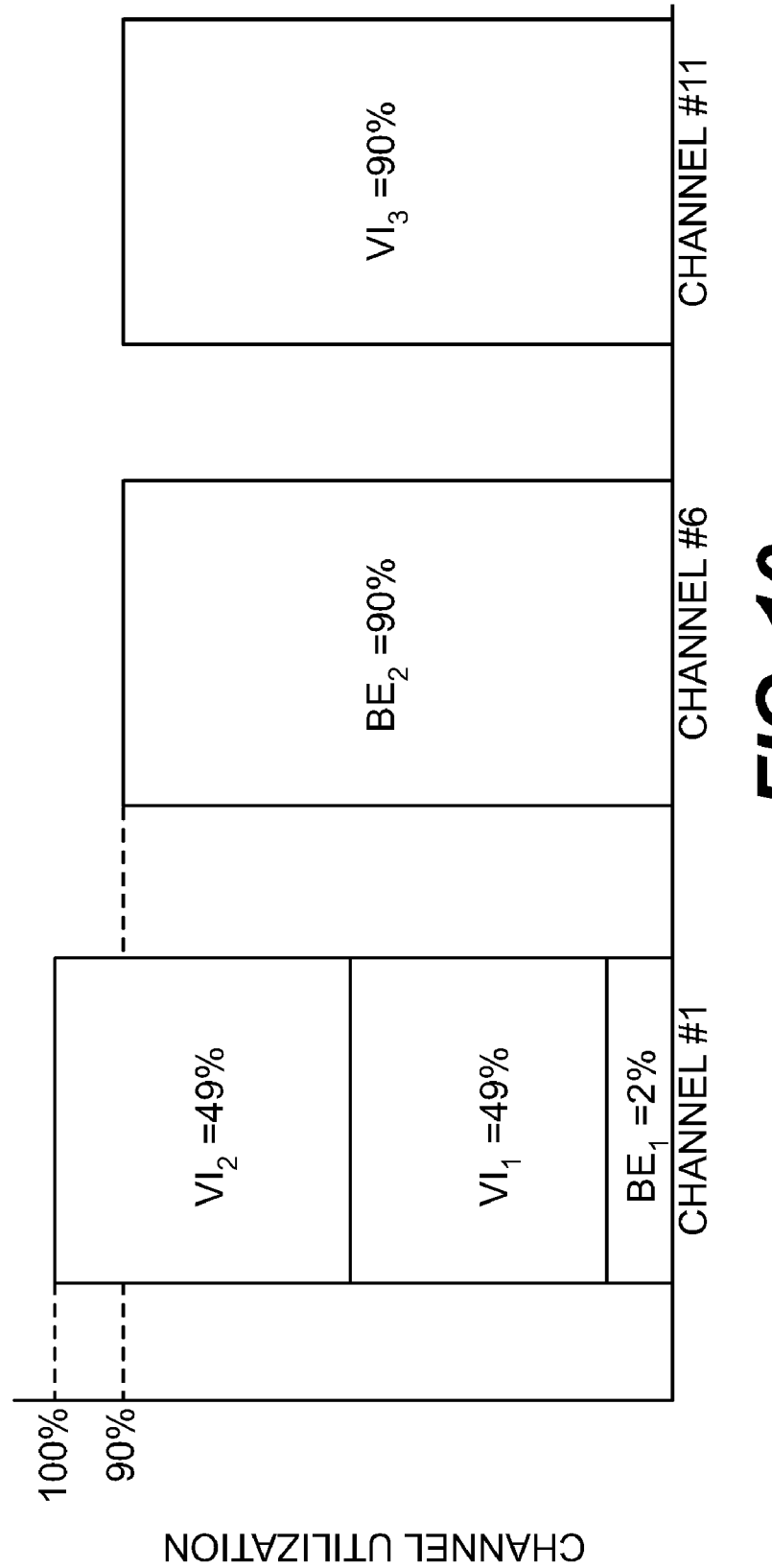
FIG. 10 is a graph illustrating a resulting scenario after applying channel assessment and control on the example scenario of FIG. 9, in accordance with a system not implementing the present invention.

FIG. 10 is a graph illustrating a resulting scenario after applying channel control on the example scenario of FIG. 9, in accordance with a system not implementing the invention. The new STA 220 wishing to join one of the BSS 205 of FIG. 9 might determine that channel #1 has the lowest channel utilization, and thus may join the BSS 205 using channel #1. Assuming that a streaming video request would use 60% of available utilization, the STA 220 will be forced to share its channel utilization with the second STA 220 also calling for VI traffic, which currently amounts to 60% of channel utilization, and with the third STA 220 calling for BE traffic, which currently amounts to 10% of channel utilization. BE traffic will be squeezed to a minimum 2% of channel utilization. Each VI traffic stream will be forced to share half of the remaining 98% of channel utilization, or 49% of channel utilization each. Accordingly, each STA 220 requesting 60% of channel utilization will be 11% deficient.

Figure 11:
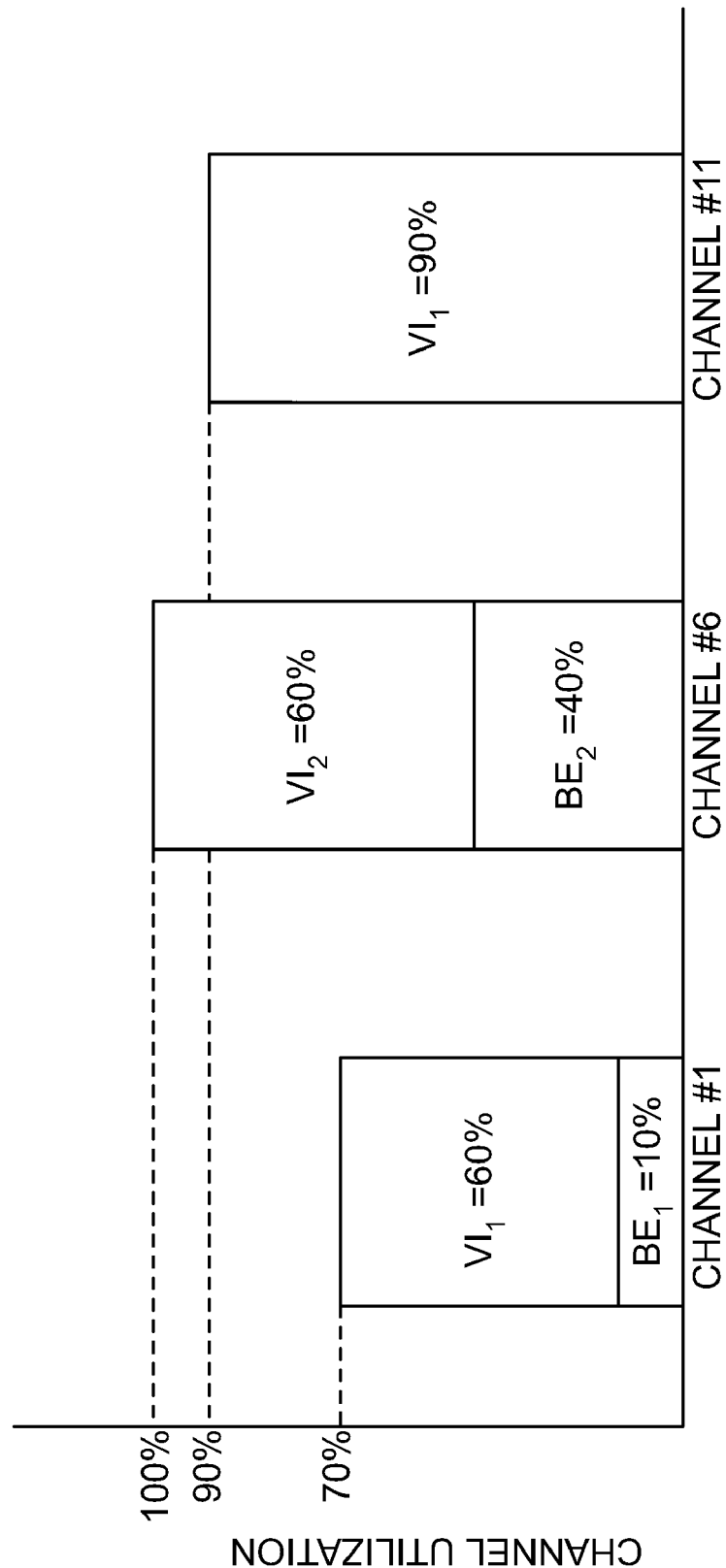
FIG. 11 is a graph illustrating a resulting scenario after applying channel assessment and control on the example scenario of FIG. 9, in accordance with an embodiment of the present invention.

FIG. 11 is a graph illustrating a resulting scenario after applying channel control on the example scenario of FIG. 9, in accordance with an embodiment of the present invention. As shown, the new STA 220 wishing to join one of the BSS 205 of FIG. 9 will determine that channel #6 has the greatest channel suitability index (CSI), since the link quality (LQ) parameter will indicate high link quality and the contention faced (CF) parameter will indicate low contention for VI traffic. Accordingly, the VI traffic of the incoming STA 220 will assume a full 60% of channel utilization. BE traffic will use the remaining 40%. The STA 220 will not compromise any VI traffic.

Figure 12:
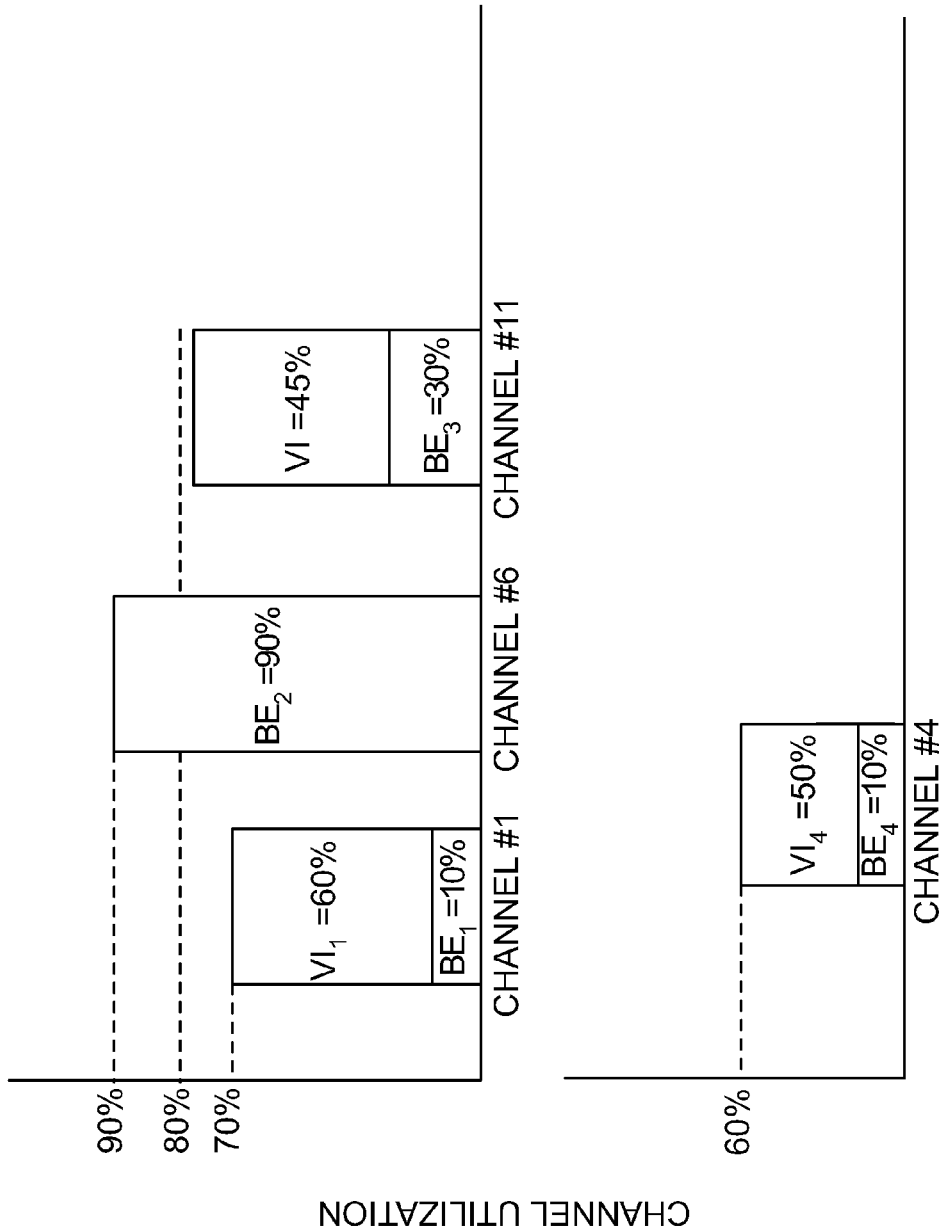
FIG. 12 is a graph illustrating an example scenario in which channel assessment and control would be helpful, in accordance with an embodiment of the present invention.

FIG. 12 is a graph illustrating an example scenario in which channel control would be helpful, in accordance with an embodiment of the present invention. As shown, of 100% channel utilization, channel #1 includes 10% BE traffic and 60% VI traffic for a first BSS 205. Of the 100% channel utilization, channel #6 includes 90% BE traffic for a second BSS 205. Of the 100% channel utilization, channel #11 includes 30% BE traffic and 45% VI traffic. If an existing BSS 205 currently using 10% BE traffic and 50% VI traffic wishes to select a new channel, the BSS 205 can choose from the available channels. In the illustrated example, the BSS 205 may be currently using channel #4, which overlaps and may be currently receiving interference from the BSSs 205 of channel #1 and channel #6. The AP 215 of the existing BSS 204 may benefit from channel suitability assessment of each of the channels to find the channel most suitable.

Figure 13:
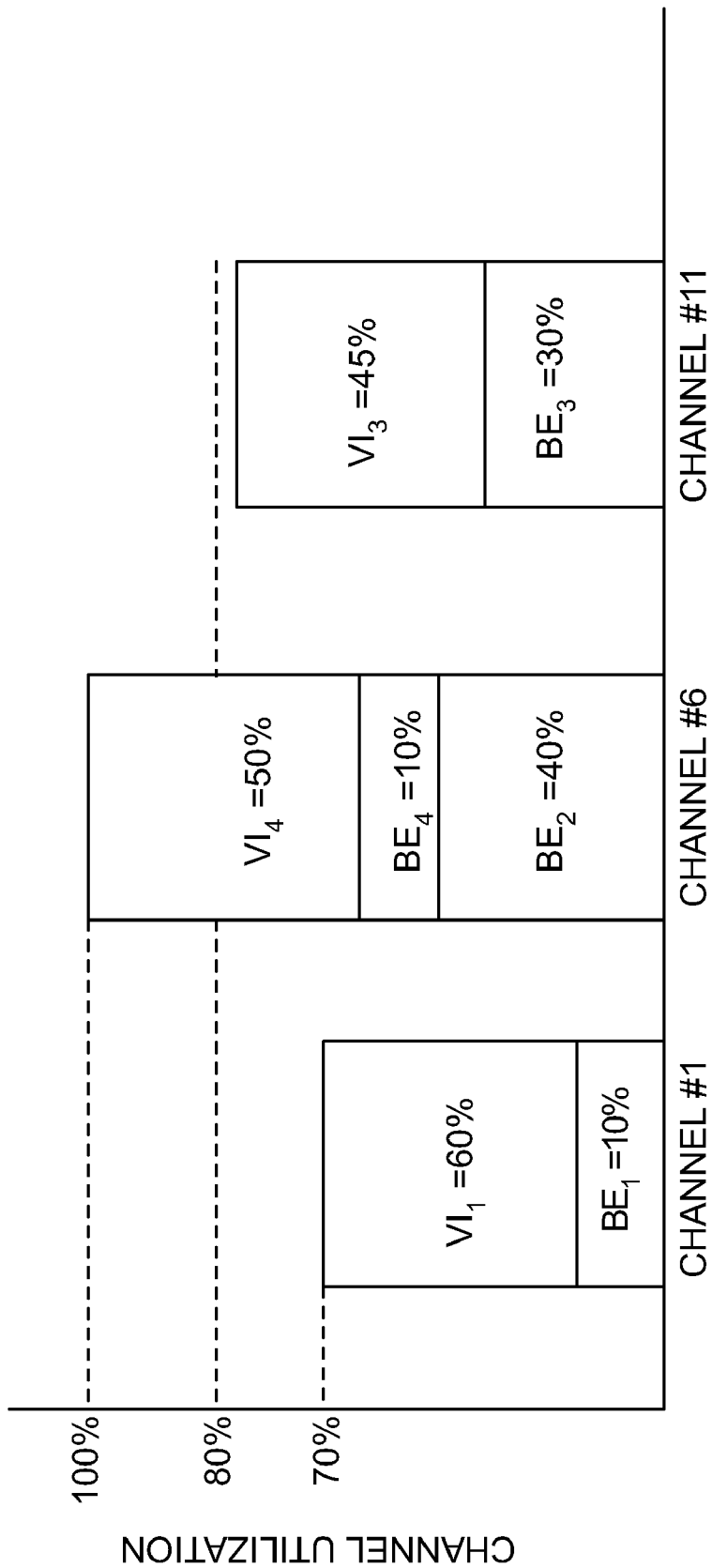
FIG. 13 is a graph illustrating a resulting scenario after applying channel assessment and control on the example scenario of FIG. 12, in accordance with an embodiment of the present invention.

FIG. 13 is a graph illustrating a resulting scenario after applying channel control on the example scenario of FIG. 12, in accordance with an embodiment of the present invention. As shown, the BSS 205 selected channel #6, because channel #6 would likely have the best channel suitability index (CSI). Since channel #1 has a STA 220 using 60% of channel utilization for VI traffic, the BSS 205 would need to compromise its VI traffic. Since channel #11 has a STA using 45% of channel utilization for VI traffic and 30% of channel utilization for BE traffic, the BSS 205 would have to compromise some of its BE traffic (while it may not need to compromise any of its VI traffic). However, since channel #6 only has a STA 220 using 90% of channel utilization for BE traffic, the BSS 205 need not compromise any of its traffic.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general-purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A system comprising:
a candidate channel assessment module for obtaining at least one access class (AC)-specific channel suitability metric for each of two different channels, and for using the AC-specific channel suitability metrics to determine a channel suitability index (CSI) of each of the two different channels;
a channel selection module for using the channel suitability index to select one of the two different channels which has the greatest channel suitability index as a new channel; and
a channel setting module for configuring a wireless transceiver to use the new channel,
wherein the CSI is calculated based on a link quality (LQ) and a contention-faced (CF).

2. The system of claim 1, wherein the channel assessment module applies the following equations to generate the channel suitability index (CSI):

$$CSI=\Psi(LQ,CF)$$

where $\Psi$ indicates a function defining the relative success in transmitting a packet error free and is defined as:

$$\Psi(LQ,CF)=LQ \times CF$$

where LQ indicates link quality and CF indicates contention-faced.

3. The system of claim 2, wherein the LQ is defined as:

$$LQ = \sum_{ACI=0}^{3} \sigma_{ACI} \Omega(\overline{RSSI}_{ACI})$$

where $\sigma$ indicates a weight associated with a particular AC, the subscript ACI identifies AC index, RSSI indicates a mean received signal strength indicator, $\Omega$ indicates a function defining link robustness.

4. The system of claim 3, wherein the CF is defined as:

$$CF = \sum_{ACI=0}^{3} \tau_{ACI} \Gamma(N_{ACI}, CU_{ACI}, APER_{ACI})$$

where $\tau$ indicates a weight associated with a particular AC, CU indicates channel utilization, APER indicates average packet error rate, N indicates the number of active wireless stations (STAs), and $\Gamma$ is a function defining relative contention faced when trying to gain access to the respective channel.

5. The system of claim 4, wherein $\Omega$ is defined as:

$$\Omega(\overline{RSSI}_{ACI}) = 1 - \frac{1}{2}\text{erfc}\left(\sqrt{\overline{RSSI}_{ACI}}\right)$$

where erfc(.) indicates a complementary Gaussian error function.

6. The system of claim 5, wherein $\Gamma$ is computed as:

$$\Gamma = \frac{\{(100 - CU_{ACI}) + (100 - APER_{ACI})\}}{2N_{ACI}}.$$

7. A method comprising:
obtaining at least one access class (AC)-specific channel suitability metric for each of two different channels;
using the AC-specific channel suitability metrics to determine a channel suitability index (CSI) of each of the two different channels;

using the CSI to select one of the two different channels having the greater channel suitability index as a new channel; and configuring a wireless transceiver to use the new channel, wherein the CSI is calculated based on a link quality (LQ) and a contention-faced (CF).

8. The method of claim 7, further comprising:

applying the following equations to generate the channel suitability index (CSI):

$$CSI = \Psi(LQ, CF)$$

where $\Psi$ indicates a function defining the relative success in transmitting a packet error free and is defined as:

$$\Psi(LQ, CF) = LQ \times CF$$

where LQ indicates link quality and CF indicates contention-faced.

9. The method of claim 8, wherein the LQ is defined as:

$$LQ = \sum_{ACI=0}^{3} \sigma_{ACI} \Omega(\overline{RSSI}_{ACI})$$

where $\sigma$ indicates a weight associated with a particular AC, the subscript ACI identifies AC index, RSSI indicates a mean received signal strength indicator, $\Psi$ indicates a function defining link robustness.

10. The method of claim 9, wherein the CF is defined as:

$$CF = \sum_{ACI=0}^{3} \tau_{ACI} \Gamma(N_{ACI}, CU_{ACI}, APER_{ACI})$$

where $\tau$ indicates a weight associated with a particular AC, CU indicates channel utilization, APER indicates average packet error rate, N indicates the number of active wireless stations (STAs), and $\Gamma$ is a function defining relative contention faced when trying to gain access to the respective channel.

11. The method of claim 10, wherein $\Omega$ is defined as:

$$\Omega(\overline{RSSI}_{ACI}) = 1 - \frac{1}{2} \text{erfc}\left(\sqrt{\overline{RSSI}_{ACI}}\right)$$

where erfc(.) indicates a complementary Gaussian error function.

12. The method of claim 11, wherein $\Gamma$ is computed as:

$$\Gamma = \frac{\{(100 - CU_{ACI}) + (100 - APER_{ACI})\}}{2 N_{ACI}}.$$

* * * * *